United States Patent [19]

Fonden et al.

[11] 3,724,333
[45] Apr. 3, 1973

[54] OPERATING SYSTEM FOR AIRCRAFT BARRIER NETS

[75] Inventors: Per Borje Fonden; Karl Ove Torgny Walander, both of Linkoping, Sweden

[73] Assignee: Borgs Fabriks AB, Norrkoping, Sweden

[22] Filed: Oct. 23, 1970

[21] Appl. No.: 83,439

[30] Foreign Application Priority Data

Dec. 4, 1969    Sweden .................................. 16740

[52] U.S. Cl. ...................... 91/411 R, 91/413, 60/51, 60/97 H
[51] Int. Cl. .............................................. F15b 11/16
[58] Field of Search...91/411 B, 411 R, 413; 60/97 H

[56]    References Cited

UNITED STATES PATENTS

| 3,237,406 | 3/1966 | Spannhake et al. | 60/51 |
| 3,547,007 | 12/1970 | Peters | 91/411 R |
| 3,610,103 | 10/1971 | Adams et al. | 91/411 R |
| 2,650,782 | 9/1953 | Fehring | 91/411 R |
| 3,181,430 | 5/1965 | Freedy et al. | 91/413 |
| 3,223,382 | 12/1965 | Mercier et al. | 91/411 R |
| 3,252,381 | 5/1966 | Gratzmuller | 91/411 R |

FOREIGN PATENTS OR APPLICATIONS 1,176,822    1/1970    Great Britain ..................... 91/411 B Primary Examiner—Edgar W. Geoghegan
Attorney—Munson & Fiddler

[57]    ABSTRACT

Device for operating an aircraft arresting mechanism in which the barrier supporting standard is raised and lowered with respect to the runway by two servomotors, one being larger than the other, the larger one producing the smallest moment and the smaller servomotor producing the largest moment when the standard rests in the lowered position, the moments being so balanced as to exert a downward torque on moments being so balanced as to exert a downward torque on the standard in the lowered position, control means being provided to convert the moments so as to produce a first stage gradual raising operation and a rapid second stage raising operation.

4 Claims, 8 Drawing Figures

PER BORJE FONDEN, et al
INVENTORS

BY MUNSON & FIDDLER
ATTORNEYS

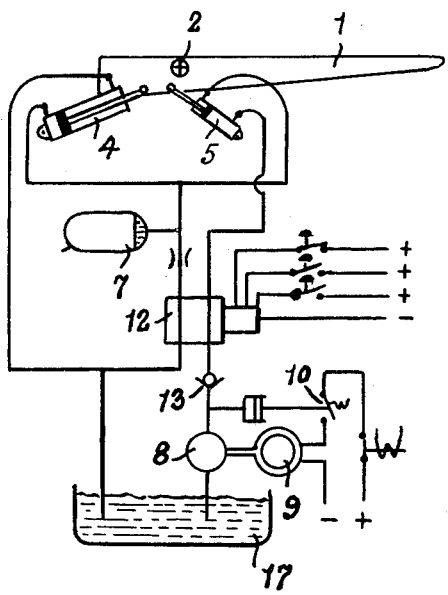
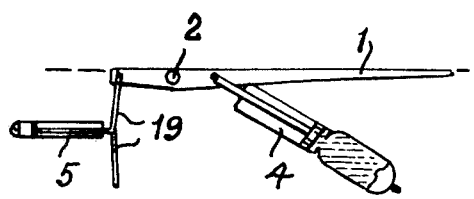
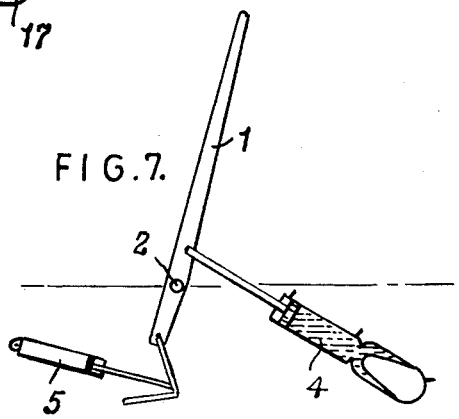
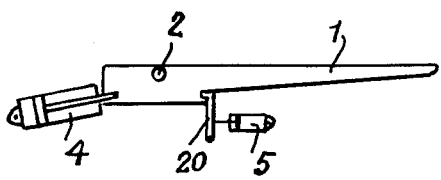

3,724,333

OPERATING SYSTEM FOR AIRCRAFT BARRIER NETS

BACKGROUND OF THE INVENTION

When concerned with systems for large aircraft, for example large civil aircraft, the barrier net-supporting standards are generally of large dimensions. It is required that the net be raised automatically and at the last moment and only if and when it is needed so that the raised net does not normally present an obstacle to aircraft landing and taking off. These requirements mean that the standards and the net must be capable of being raised at speeds which render previously known means and methods unsuitable. The present invention relates to an improvement for solving this problem.

The present invention therefore relates to an operating system for aircraft barrier nets for raising and lowering pivoted standards that support the net including servomotors that are operated by means of a pressure medium used for said operating system for the purpose of providing the necessary forces and torque.

SUMMARY OF INVENTION

The objects and advantages of the invention will be apparent from the accompanying drawings in which:

FIG. 5 is a diagrammatic view showing the device when the lowering operation has been completed;

FIG. 6 is a diagrammatic view of a linkage arrangement for the servomotors used in connection with the invention;

FIG. 7 is a diagrammatic view showing the arrangement of FIG. 6 in raised position;

FIG. 8 is a diagrammatic view wherein the smaller one of the servomotors according to the invention is provided with locking means.

The invention is illustrated in the accompanying drawings in which FIGS. 1 to 8 inclusive shown the arrangement in different positions.

Figure 1:
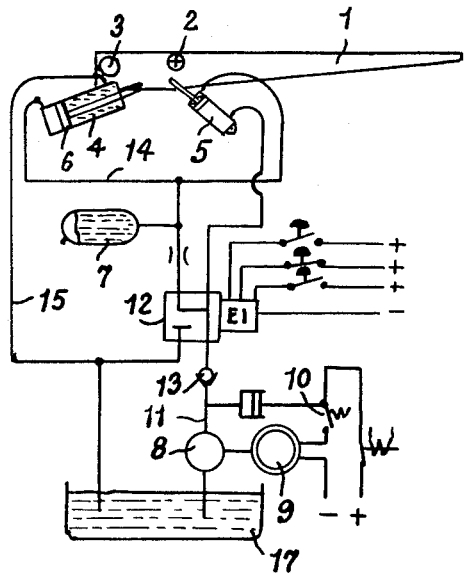
FIG. 1 is a diagrammatic view of the barrier net standard in its lowered position.

At 1 in the drawings is shown a standard in its collapsed or lowered position. The standard is pivotally supported by a pivot pin 2 and can be optionally provided with a balancing counterweight 3. The standard 1 is actuated by two types of servomotor, a large one being shown at 4 and a smaller one at 5. The larger one 4 is adapted to effect the main standard-raising operation. FIG. 1 shows a lowered standard in position to be rapidly raised whenever required. The pressure side 6 of the servomotor 4 is subjected to pressure by a liquid supplied by an accumulator 7. A pump 8 maintains the pressure at a suitable level. The pump 8 is driven by a motor 9, which is controlled by a pressure monitor 10 actuated by the pressure in a line 11, which passes to an electrically-operated switching valve 12. A non-return valve 13 is incorporated in the line 11. As soon as the pressure in the line 11 falls below a set value, the pump 8 is started. Positioned between the accumulator 7 and the pressure side 6 of the servomotor 4 is a line 14, which is so dimensioned that a rapid supply of pressure medium is obtained, that is short and wide.

In order to secure the necessary rapid operating moments, the system is designed to carry out the described performances without the presence of valves in the line 14.

The larger servomotor 4 is arranged so that when the standard 1 occupies its lowered position, the servomotor produces the smallest moment, or even a negative torque and this is achieved by causing the arm along which the torque moment acts, to pass close to the pivot point 2 of the standard when the standard is lowered. The torque can be a lifting movement or a moment tending to retain the standard in a lowered condition, but which however, provides two different variations in the connection of the smaller servomotor with the system. The smaller servomotor is adapted to provide its approximate largest moment in the lowered position of the standard and the moment is balanced so that, with respect also to the moment produced by the arm of the net and the standards, the resulting moment with the standard lowered produces a restraining force. As soon as the standard is raised through just a few degrees, from its lowered position however, the standard will be actuated by the lifting moment produced by the larger servomotor.

The system is so balanced that if a change in the connection of the smaller servomotor in the system takes place, the restraining moment is converted into a raising moment. After this moment has progressed only a few degrees, the torque is increased, as described above, and lifting continues until the standard is fully raised. The power transmission in the smaller servomotor can also be provided, for example by causing the smaller servomotor to be fully disengaged from the system when in rest condition, and arranging for said servomotor to be pressure-connected to the pressure side of the servomotor 4 by a valve movement when wishing to raise the standard. In this case only the moment produced by the larger servomotor and the arm of the net and the standard results in a the downwardly holding force. The pressure side is presumed for both motors to produce a lifting moment when the largest forces are required here, and since the pressure side for a given force best decides the dimensions. For the purpose of solely producing a lifting moment, the system will also function with single-acting servomotors, although double-acting cylinders can also be properly used, so that the same hydraulic system can also be used for the lowering movement of the standards. In this connection it is essential that a short and wide outlet line 15 is also passed from the drag side, to permit rapid flow of the hydraulic fluid.

The system can also be balanced in a manner whereby the force exerted by the large motor and the weights of the system provides a lifting effect in the lowered position of the standard. In such case, the drag side of the smaller servomotor is connected to the same hydraulic pressure source as that on the pressure side of the larger servomotor, whereby the system is balanced in a manner so that the torque, with the addition of the contribution of the smaller servomotor is now a downwardly-holding force. If the pressure is then disconnected from the pressure side of the smaller servomotor or, alternatively, the drag side of said servomotor is also connected to the system, the standard will immediately begin to rise. The desired change-over of the smaller servomotor is effected by the valve 12, operated either from a known automatic net-rigging apparatus or manually such as from the airfield control tower. By using double-acting servomotors and by suitable adjustment of the system, a lowering movement can also be obtained, if desired, and initiation of the raising and lowering sequence is effected by an electrically-operated system via a tripping battery 16. The hydraulic system also includes conventional components such as a hydraulic fluid sump 17.

Figure 2:
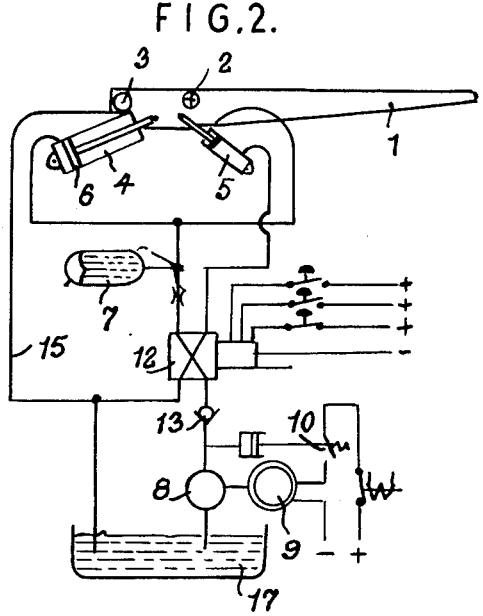
FIG. 2 is a diagrammatic view showing the commencement of the raising operation.
Figure 3:
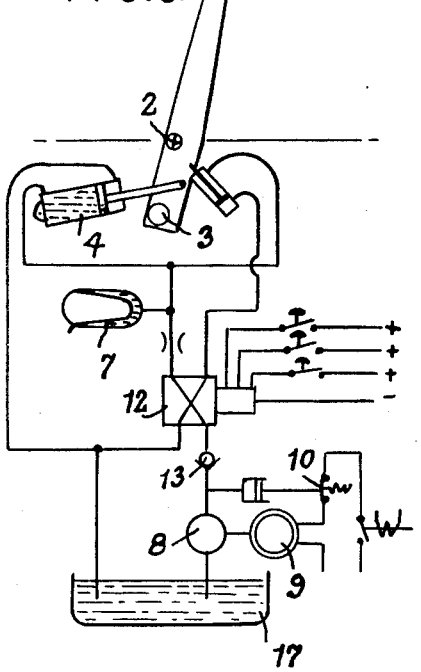
FIG. 3 is a diagrammatic view showing the barrier standard moved into a raised position.

FIG. 2 shows the system when lifting has begun. The valve 12 has been switched over so that pressure fluid passes to the drag side of the motors, while the opposite side is connected with the sump 17. The pressure side of the servomotor 4 has accumulator pressure, while the opposite side is connected with the sump. The standard is thereby raised from its resting position by the servomotors and, as shown in FIG. 3, moved to raised position essentially by the servomotor 4.

Figure 4:
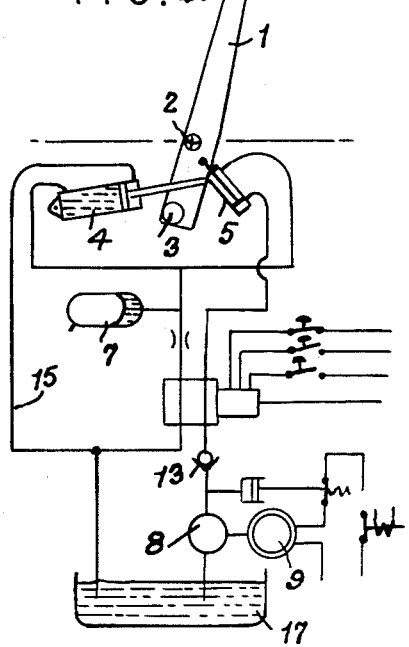
FIG. 4 is a diagrammatic view showing the commencement of the lowering of the standard.

FIG. 4 illustrates a beginning standard lowering operation. The pressure side of the servomotor 4 and the drag side of the motor 5 are connected to the sump 17, while pressure fluid is passed to the pressure side from the pump 8.

FIG. 5 illustrates the position when lowering of the standard has been completed. At 18 is indicated a constriction.

The system is designed so that the standard is lowered gently during emptying of the accumulator 7.

The system has been described with reference to only one standard, although obviously the same system can be used to operate, at least partly, both standards. The system shown in the drawings has also been chosen to illustrate the variation in which the drag side of the smaller servomotor is connected to the ready position for lifting, and lifting is initiated without exposing the pressure side to hydraulic pressure.

It will be understood that the concept of the invention includes variations other than those described. For example, the smaller servomotor, which according to the foregoing, acts directly on the standard, may be adapted in different ways to actuate the standard indirectly. This can be accomplished through a linkage system 19 as shown in FIG. 6 wherein the link system, which can be constructed in a number of different ways, is designed to provide a positive holding effect in the lowered position of the standard through an override movement, despite the fact that the larger servomotor in this case is presumed to produce a relatively large moment even in the lowered position.

A further variation is that the smaller servomotor is adapted to actuate a mechanical locking means 20, as shown in FIG. 8, which holds the standard securely in its lowered position, despite the fact that in the ready position a lifting moment is produced on the standard by the larger servomotor 4.

The drawings illustrate one servomotor at 4 and one at 5, but it will be understood that there may be arranged two or more co-operating motors at each point without departing from the spirit of the invention.

What is claimed is:

1. A device for operating an aircraft arresting device, comprising:
   a. a barrier supporting a standard having a fulcrum axis about which the standard is rotated from a lowered position into a raised position relative to a runway;
   b. a pair of linearly double-acting hydraulic motors comprising a cylinder, a piston and a piston rod reciprocably mounted therein, the rods extending outwardly from one end of the cylinders;
   c. one of said hydraulic motors having larger capacity than the other one;
   d. the piston rod of the motor having larger capacity being pivoted to an arm of said standard at a point spaced from the fulcrum axis of said arm where said rod has its shortest crank lever when the standard is in its lowered position and has its longest crank lever when the standard is in raised position;
   e. the piston rod of the other one of said motors being pivoted to said arm at a point spaced from its fulcrum axis where said piston rod has its longest crank lever when the standard is in its lowered position and has its shortest crank lever when the standard is in its raised position;
   f. means for supplying hydraulic fluid to the opposite ends of said cylinders to move the pistons and the piston rods to raise and lower said standard, and
   g. control means effective to supply hydraulic fluid to one end of said cylinders to cause the respective piston rods to produce a torque on said arm during the raising and lowering operation of the standard while evacuating hydraulic fluid from the other end of the cylinders.

2. Device according to claim 1 in which the pressure fluid supply means includes at least one accumulator.

3. Device according to claim 1, in which the pressure fluid supply means includes means for supplying pressure fluid to the larger one of the servomotors at an increased rate.

4. Device according to claim 1 having means for selectively disengaging and re-engaging the smaller one of the servomotors to the standard.

* * * * *